(12) United States Patent
Holzapfel et al.

(10) Patent No.: US 9,389,100 B2
(45) Date of Patent: Jul. 12, 2016

(54) OPTICAL POSITION MEASURING INSTRUMENT

(71) Applicant: Dr. Johannes Heidenhain GmbH, Traunreut (DE)

(72) Inventors: Wolfgang Holzapfel, Obing (DE); Joerg Drescher, Samerberg (DE); Markus Meissner, Uebersee (DE); Ralph Joerger, Traunstein (DE); Bernhard Musch, Traunreut (DE); Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 37 days.

(21) Appl. No.: 14/075,088

(22) Filed: Nov. 8, 2013

(65) Prior Publication Data

US 2014/0132964 A1     May 15, 2014

Related U.S. Application Data

(60) Provisional application No. 61/724,436, filed on Nov. 9, 2012.

(30) Foreign Application Priority Data

Nov. 9, 2012   (DE) .......................... 10 2012 021 935

(51) Int. Cl.
| | | |
|---|---|---|
| *G01B 11/24* | (2006.01) | |
| *G01D 5/26* | (2006.01) | |
| *G01D 5/347* | (2006.01) | |

(52) U.S. Cl.
CPC ........ *G01D 5/26* (2013.01); *G01B 11/24* (2013.01); *G01D 5/3473* (2013.01)

(58) Field of Classification Search
CPC ...................... G01N 15/1463; G01N 21/6428
USPC ................ 250/231.13–231.16; 356/616, 499
See application file for complete search history.

(56) References Cited

U.S. PATENT DOCUMENTS

| | | | | |
|---|---|---|---|---|
| 6,418,630 B1 * | 7/2002 | Genevois | ............. | G06G 1/0005 33/1 SB |
| 8,804,131 B2 * | 8/2014 | Holzapfel | ................ | G01D 5/38 356/499 |

(Continued)

FOREIGN PATENT DOCUMENTS

| | | | |
|---|---|---|---|
| EP | 1 923 672 A2 | 5/2008 | |
| EP | 2 450 672 A2 | 5/2012 | |
| EP | 2 520 906 A1 | 11/2012 | |

OTHER PUBLICATIONS

European Search Report from EP Application No. 13 19 0183 dated Sep. 16, 2015 (3 pages).

*Primary Examiner* — Kara E Geisel
*Assistant Examiner* — Iyabo S Alli
(74) *Attorney, Agent, or Firm* — Brinks Gilson & Lione

(57) ABSTRACT

An optical position measuring instrument including a first scale having a first graduation, wherein the first scale is disposed movable in a first measuring direction, and at a first defined position in the first measuring direction, the first scale includes a spatially limited first marking that differs from the first graduation. The optical position measuring instrument further including a second scale having a second graduation, wherein the second scale is disposed movable in a second measuring direction, and at a second defined position, the second scale includes a second reference marking that is usable for generating at least one reference signal at a reference position of the second scale only if the first scale is located in the first defined position.

17 Claims, 10 Drawing Sheets

(56) References Cited

U.S. PATENT DOCUMENTS

| | | |
|---|---|---|
| 2005/0174111 A1 | 8/2005 | Burgschat et al. |
| 2008/0117440 A1 | 5/2008 | Saendig |
| 2010/0296068 A1 | 11/2010 | Shibazaki |
| 2012/0105862 A1 | 5/2012 | Holzapfel |
| 2012/0281238 A1 | 11/2012 | Hermann |

* cited by examiner

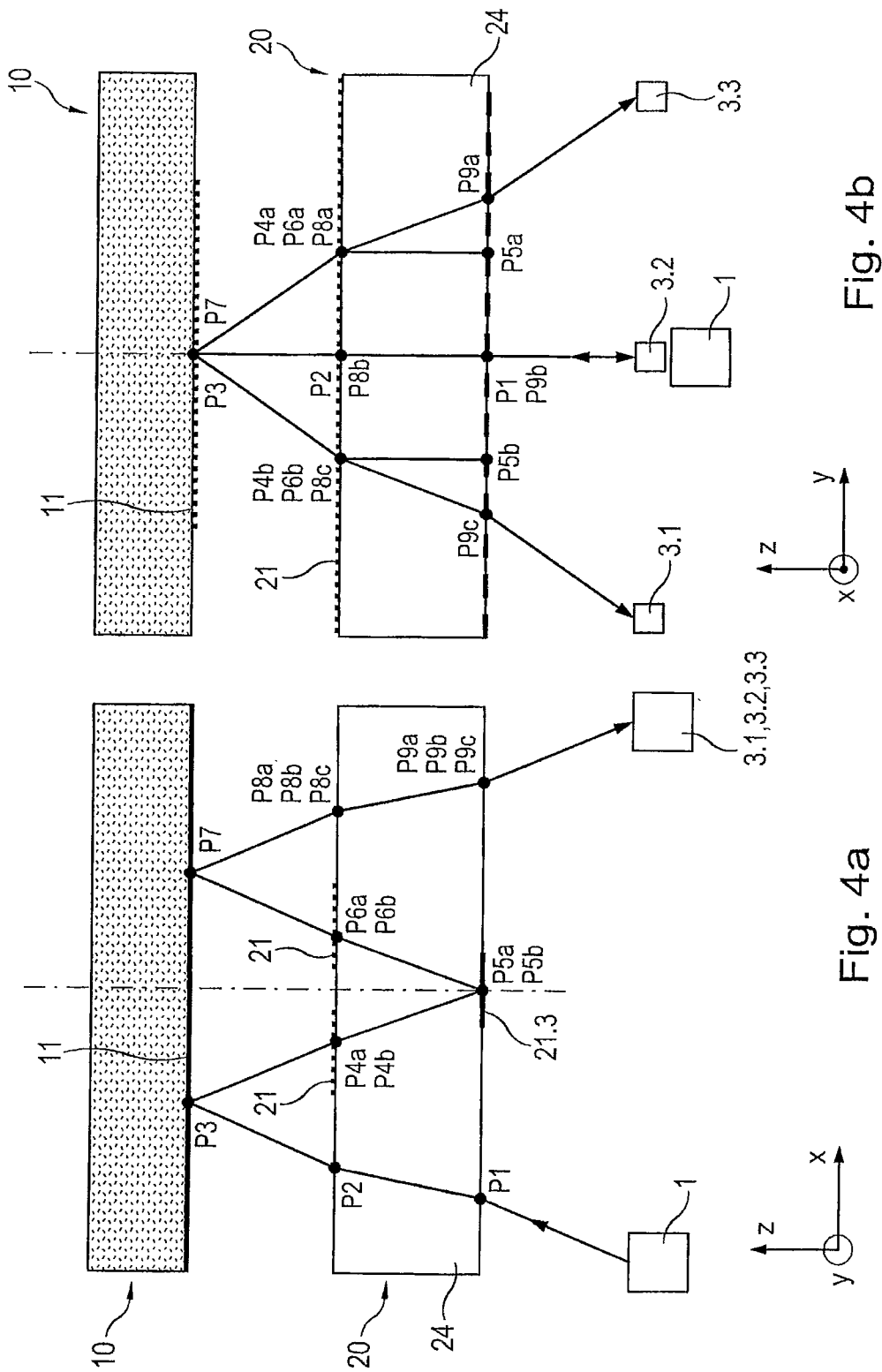

OPTICAL POSITION MEASURING INSTRUMENT

RELATED APPLICATIONS

This application claims the benefit of priority under 35 U.S.C. §119(e)(1) of U.S. Provisional Application Ser. No. 61/724,436 titled Optische Positionsmesseinrichtung, filed Nov. 9, 2012, the entire contents of which is incorporated herein by reference.

Applicants claim, under 35 U.S.C. §119, the benefit of priority of the filing date of Nov. 9, 2012 of a German patent application, copy attached, Serial Number 10 2012 021 935.0, filed on the aforementioned date, the entire contents of which is incorporated herein by reference.

BACKGROUND

1. Technical Field

The present invention relates to an optical position measuring instrument.

2. Background Information

From the second embodiment described in US Patent Application Publication No. 2012/105862 A1 of the present Applicant, the entire contents of which are incorporated herein by reference, an optical position measuring instrument is known which includes two scales movable relative to one another. A first scale, which in the aforementioned document is called a scanning grating, includes a first graduation embodied as an incident light grating. A second scale, which in that document is called an index disk, includes a second graduation, which includes a radial transmitted light grating and a reflector. The first scale and the second scale are disposed movable relative to one another; the two scales are movable independently of one another. The first scale is disposed movable in a first linear measuring direction; the second scale is disposed rotatably about an axis of rotation. With the aid of this position measuring instrument, position signals with regard to the position of the respective scale or scales are generated, which in one possible embodiment are delivered to a downstream evaluation unit, which by way of them controls the positioning of machine components.

To make the use of such a position measuring instrument in machines for high-precision applications possible, a scale-dependent position correction table is used in the measurement operation for correcting the typically present short-range grating errors in the graduations employed. Such a position correction table is created, for instance, in the manufacture of the corresponding graduations, or in the calibration of the machine. The correction data stored in the table are then used in the measurement operation for correcting the position signals generated. To enable correcting the incident grating errors in this way, the particular position correction table must be put in relation to the associated graduation; this is hereinafter called referencing. Such referencing requires that the position of a scanning beam be detected by measurement at a defined reference position on the graduations employed, so that in the measurement operation the particular position correction table that is referenced to the reference position can be used. The corresponding reference position is typically predetermined by one or more markings or reference markings on the respective scale. If such a reference marking is integrated into the graduation, however, the result is an unwanted impairment of the position signals.

In the case of the optical position measuring instrument known from US Patent Application Publication No. 2012/105862 A1, with scales that can be positioned independently of one another, such referencing must be done for each of the two graduations used.

Besides the referencing in the case where a position correction table is used, referencing can also be required particularly in incremental position measuring instruments, in order that, at a known position along the measurement path, an absolute reference to the incremental measurement can be established. The aforementioned problems can arise in this kind of referencing as well.

Hereinafter, the term "referencing" is meant to cover both of the variant procedures explained above. That is, both detecting the position of a scanning beam by measurement at a defined reference position on the graduations employed, and the establishment of an absolute positional reference in the case on an incremental measurement.

OBJECTS AND SUMMARY OF THE INVENTION

It is an object of the present invention to disclose an optical position measuring instrument which enables referencing of at least one graduation, without thereby significantly interfering with the actual position measurement.

This object is attained according to the present invention by an optical position measuring instrument including a first scale having a first graduation, wherein the first scale is disposed movable in a first measuring direction, and at a first defined position in the first measuring direction, the first scale includes a spatially limited first marking that differs from the first graduation. The optical position measuring instrument further including a second scale having a second graduation, wherein the second scale is disposed movable in a second measuring direction, and at a second defined position, the second scale includes a second reference marking that is usable for generating at least one reference signal at a reference position of the second scale only if the first scale is located in the first defined position.

The optical position measuring instrument of the present invention includes a first scale with a first graduation, which is disposed movable in a first measuring direction. At at least one defined position in the first measuring direction, the first scale has a spatially limited first marking, which differs from the first graduation. A second scale with a second graduation is also provided, which is disposed movable in a second measuring direction. At least one position, the second scale has a second reference marking, which is usable for generating at least one second reference signal at a reference position of the second scale only if the first scale is located in the particular defined position in the first measuring direction, which is predetermined by the first marking.

It can be provided that:
the first scale includes, as the first graduation, a linear grating which has graduation regions disposed periodically in a first linear measuring direction, and
the second scale includes, as the second graduation, a circular-annular grating, which has graduation regions disposed periodically in the circular circumferential direction and is disposed rotatably about the axis of rotation, so that the second measuring direction extends along the circular circumference.

In a further possible embodiment,
the first scale includes, as the first graduation, a linear grating which has graduation regions disposed periodically in a first linear measuring direction, and
the second scale includes, as the second graduation, a further linear grating, which includes graduation regions disposed periodically in a second linear measuring direction, and the second measuring direction is oriented perpendicular to the first measuring direction.

Advantageously, the first graduation is embodied as an incident light grating, which has periodically disposed graduation regions having different phase depths, and the second scale includes, as the second graduation, at least one transmitted light grating and one reflector, and the transmitted light grating and the reflector extend in the second measuring direction.

The transmitted light grating can be embodied as a combined radial/circular grating, which has periodically disposed graduation regions with different diffraction properties.

In an advantageous embodiment, it is provided that the first marking is embodied such that by way of it, a signal breakdown of the detected signals at the at least one defined position in the first measuring direction and a switching function for selective activation of the second reference marking result.

The first marking can include at least a first and a second partial marking.

It is possible that the first marking includes either:

at least one absorber region, which is integrated into the first graduation and only slightly reflects or does not reflect partial beams striking it, or at least one linear structure, which is integrated into the first marking, and the linear structure has a linear grating, the graduation regions of which are disposed in rotated fashion relative to the graduation regions of the first graduation.

The second partial marking can include at least one linear structure, which is integrated into the first graduation, and the linear structure has a linear grating, the graduation regions of which are disposed in rotated fashion relative to the graduation regions of the first graduation.

It is advantageously provided that the first marking is disposed on one longitudinal end of the first graduation.

It is possible that the first and second partial marking each have a length which is less than the diameter of the partial beam that scans it.

In one embodiment, the first marking is embodied as a reference marking and serves to generate at least one reference signal at a reference position of the first scale, and a second reference signal can be generated only if the first scale is located in its reference position.

The second reference marking can be embodied such that it can be acted upon by at least one scanning partial beam only if the first scale is located in the particular defined position in the first measuring direction that is predetermined by the first marking.

It is possible here that the second reference marking is embodied as at least one reflective reference region, which is disposed at the reference position of the second scale perpendicular to the second measuring direction, adjacent to the reflector of the second graduation.

Advantageously, the optical position measuring instrument of the present invention includes:

a light source and a detector arrangement with a plurality of detector elements, and an incident beam from the light source is split at the first graduation into two partial beams;

the partial beams are propagated in the direction of the transmitted light grating of the second graduation and there undergo a diffraction;

the diffracted partial beams are propagated in the direction of the reflector of the second graduation and there undergo a back-reflection in the direction of the transmitted light grating of the second graduation;

the partial beams are propagated in the direction of the transmitted light grating of the second graduation and there undergo another diffraction;

the diffracted partial beams are propagated in the direction of the first graduation, where a superposition of the partial beams results; and the interfering partial beams are propagated in the direction of the detector elements of the detector arrangement, so that from the optical scanning of the two scales, position signals regarding the relative position of the two scales can be generated.

By the provisions of the present invention, it is now also possible for two graduations movable independently from one another to be referenced, without thereby impairing the actual position measurement in the measurement operation. The position correction tables for the two graduations can thus be used in the actual measurement operation, for instance for correcting any grating errors that may be present; high-precision position determination is thereby ensured.

However, it is understood that merely the referencing of a sole graduation can also be done using the provisions of the present invention.

Also, the available measurement region per graduation, which is predetermined by the length of the graduation in one measuring direction, is not limited by the marking or reference marking on the other graduation.

The present invention can be employed here not only in the variant of a position measuring instrument mentioned at the outset, whose first scale includes a linear grating as an graduation, and whose second scale includes a radial grating as an graduation. In an alternative embodiment, the first and second scales can each include a linear grating as the graduation, with the linear gratings oriented perpendicularly to one another.

Further advantages of the present invention will become apparent from the ensuing detailed description of exemplary embodiments in conjunction with the accompanying drawings.

In the drawings:

BRIEF DESCRIPTION OF THE DRAWINGS

FIG. 3b is a fragmentary view of the second scale with an embodiment of a reflector in the vicinity of the second reference marking of FIG. 3a;

FIGS. 4a, 4b each show a sectional view with a possible scanning beam path of the optical position measuring instrument of FIG. 1 in accordance with the present invention;

DETAILED DESCRIPTION OF THE PREFERRED EMBODIMENTS

Figure 1:
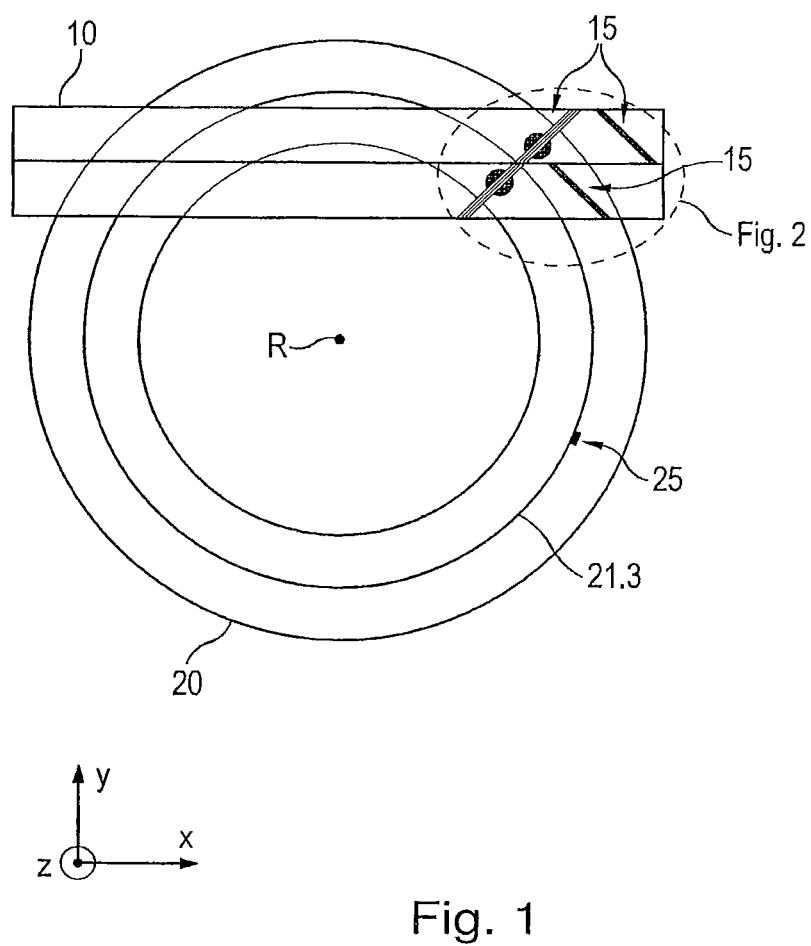
FIG. 1 is a schematic fragmentary top view of an exemplary embodiment of an optical position measuring instrument in accordance with the present invention.

In FIG. 1, components of an exemplary embodiment of the optical position measuring instrument of the present invention are shown in a highly schematic form. What is shown is a measurement arrangement of the kind already basically described in the aforementioned second exemplary embodiment of US Patent Application Publication No. 2012/105862 A1 of the present Applicant. By way of the provisions explained below, this measurement arrangement is now supplemented with one possible way of referencing the two scales 10, 20 employed. In the simplified illustration in FIG. 1, essentially only those elements of the optical position measuring instrument which are necessary for explaining the provisions of the present invention in conjunction with the referencing are shown.

Figure 6:
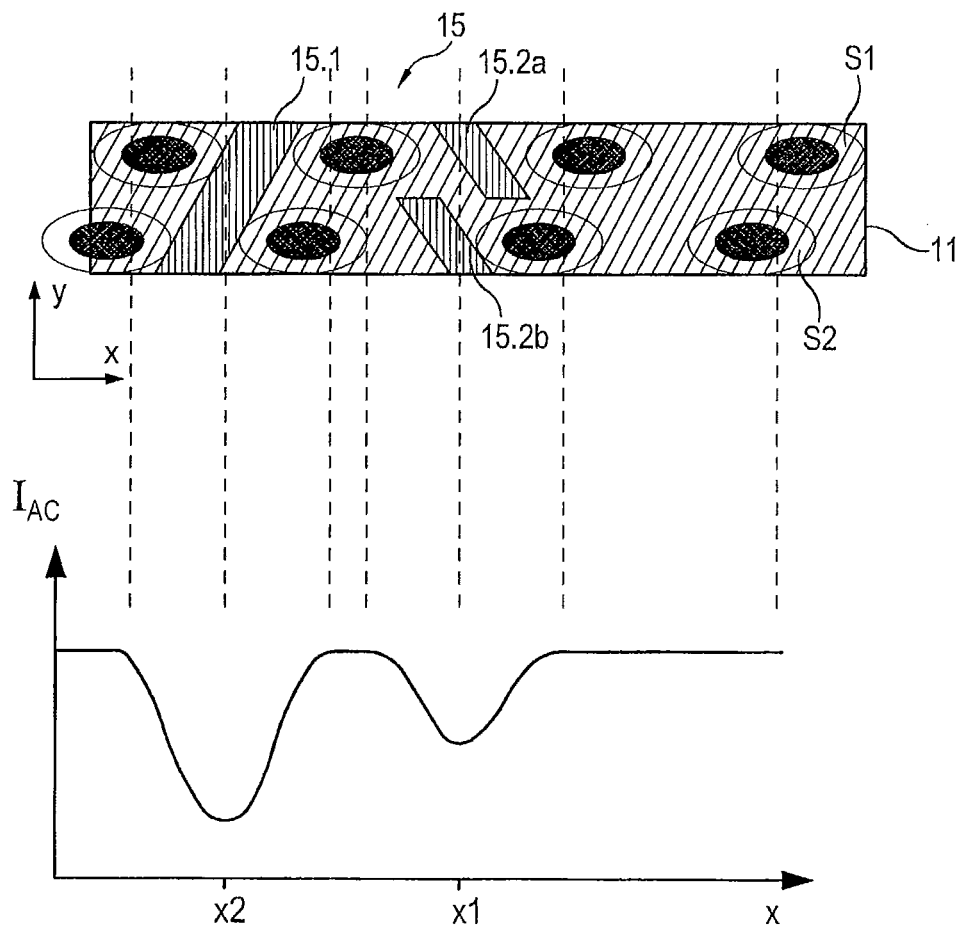
FIG. 6 is an illustration for explaining the generation of a possible first reference signal by the optical position measuring instrument of FIG. 1.
Figure 7A:
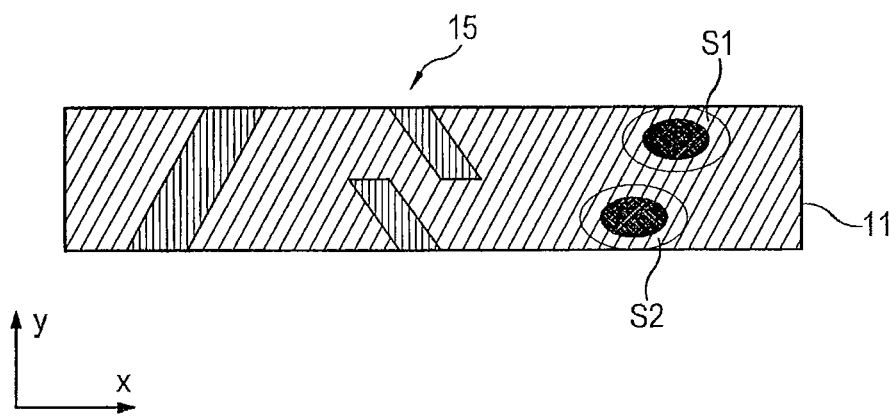
FIGS. 7a-7c, 8a-8c and 9a-9c each show an illustration for explaining the generation of a possible second reference signal by the optical position measuring instrument of FIG. 1.
Figure 7B:
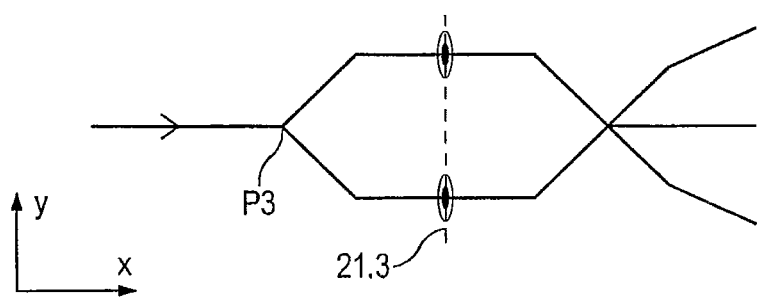

Analogously to the measuring arrangement of FIGS. 6 and 7 of the aforementioned document US Patent Application Publication No. 2012/105862 A1, in the present example the first scale 10 with a first graduation is disposed movable in a corresponding machine in a first linear measuring direction x. As can be seen from the fragmentary view of the graduation 11 in FIG. 2, the first graduation 11 is embodied here as a linear grating in the form of an incident light grating. This grating has graduation regions 11.1, 11.2, disposed in the first measuring direction x, with different phase depths. Thus, in the case where a phase grating is used, the strip-like graduation regions 11.1, 11.2 represent bars and gaps between them. It is understood that the position measuring instrument of the present invention can also include alternatively embodied first graduations, which include graduation regions disposed periodically in the first linear measuring direction, such as amplitude gratings, etc. In FIG. 1, for the sake of simplicity, the first graduation 11 used in the first scale 10 is not shown in detail.

For the same reason, in FIG. 1 a light source and a detector arrangement with a plurality of detector elements are not shown. Relative to these components of the optical position measuring instrument of the present invention, the first scale 10 is disposed movable in the first measuring direction x.

Figure 3B:
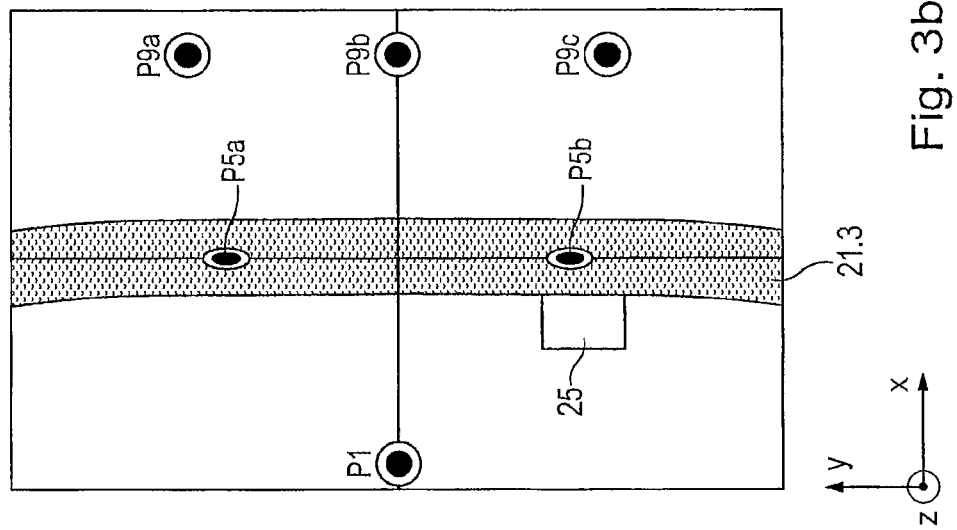
Figure 3A:
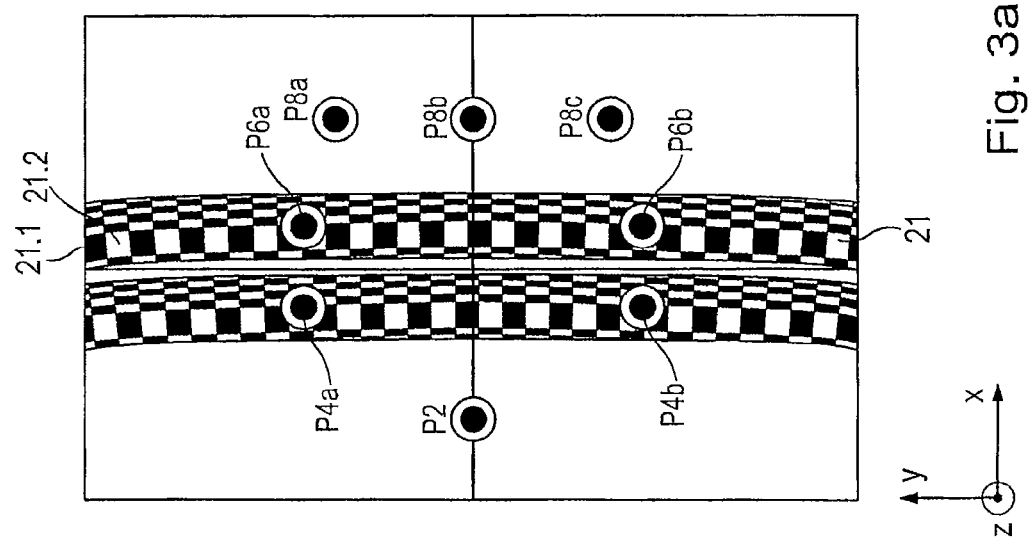
FIG. 3a is a fragmentary view of an embodiment of a second scale used with the optical position measuring instrument of FIG. 1 with an embodiment of a second graduation in the vicinity of an embodiment of a second reference marking in accordance with the present invention.

The optical position measuring instrument of the present invention further has a second scale 20 with a second graduation 21, which again is not shown in detail in FIG. 1. Fragmentary views of the second scale 20 are shown in FIGS. 3a, 3b. As the second graduation 21, the second scale 20 in the present exemplary embodiment includes a combination of a transmitted light grating and a reflector 21.3. The transmitted light grating is disposed on the top side of a plate-like substrate 24, and the reflector 21.3 is disposed on the opposite underside thereof, with its reflective side oriented in the direction of the transmitted light grating.

In the present exemplary embodiment, the second graduation 21 is embodied circular-annularly, and the transmitted light grating has graduation regions 21.1, 21.2 disposed periodically in the circular circumferential direction, with different transmission properties. For these, see the fragmentary view of the second graduation 21 in FIG. 3a, for instance.

The second graduation 21 also has the circular-annular reflector 21.3, which is shown in a top view in FIG. 3b. At least one position, a second reference marking 25, in the form of a reflective subregion, is provided perpendicular to the second measuring direction and adjacent to the circular-annular reflector 21.3. The transmitted light grating of the second graduation 21 is embodied as a so-called radial/circular grating, which has periodically disposed graduation regions 21.1, 21.2 with different diffraction properties. For details of such radial/circular gratings, see US Patent Application Publication No. 2012/105862 A1 of the present Applicant.

In the corresponding machine, the second scale 20 is disposed rotatably about an axis of rotation R and, thus, is likewise movable relative to the light source—not shown in FIG. 1—and the detector arrangement. The axis of rotation R coincides with the center of the circle of the circular-annular second graduation 21. Thus, in the present exemplary embodiment, the measuring direction of the second scale 20 extends circular-annularly about the axis of rotation R; hereinafter this will be referred to as the second measuring direction.

Figure 5:
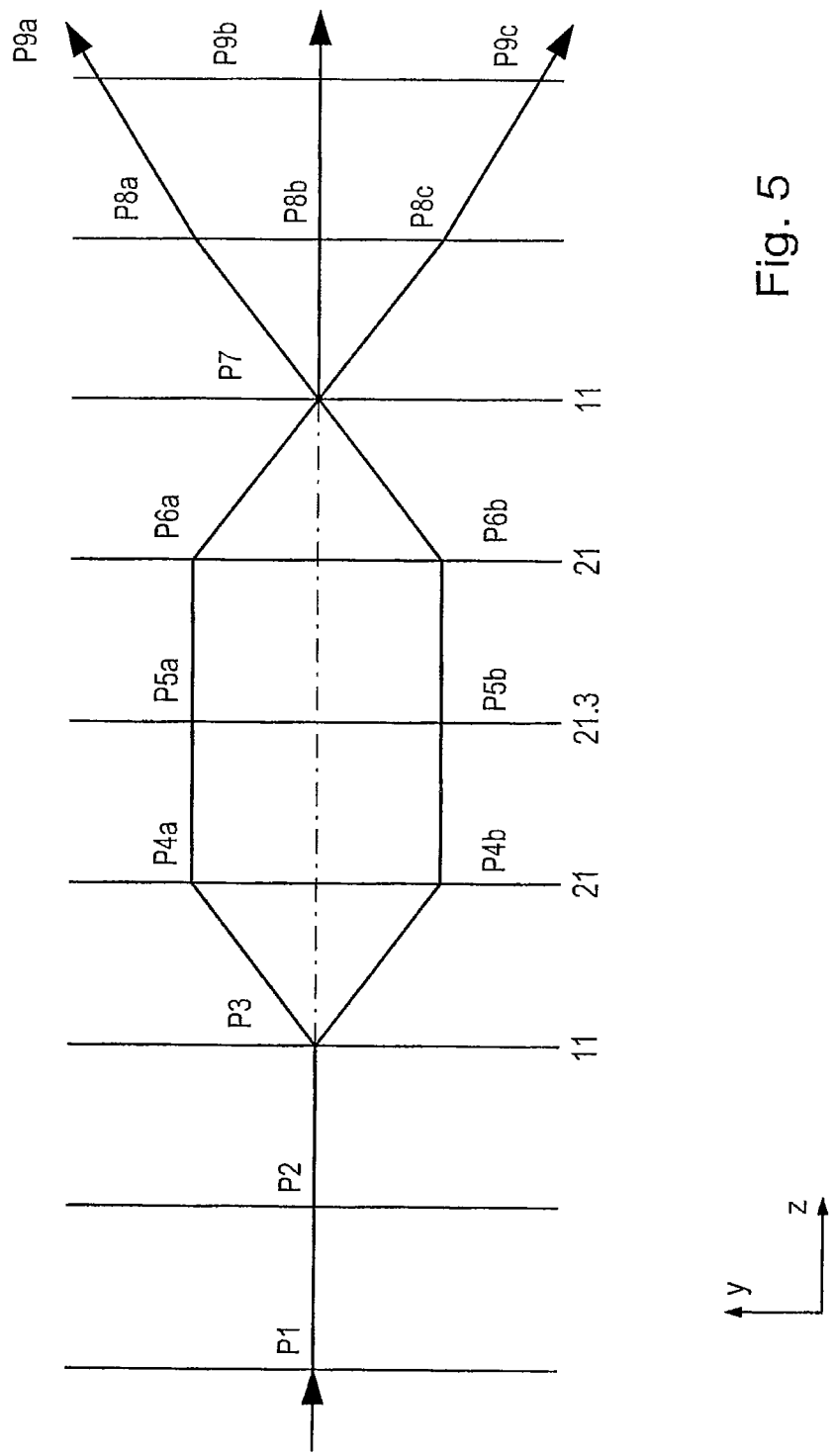
FIG. 5 shows a developed view of the scanning beam path of the optical position measuring instrument shown in FIGS. 4a, 4b.

The basic scanning beam path in the optical position measuring instrument of the present invention for generating displacement-dependent position signals regarding the relative positions of the first and second scales 10, 20 will be explained below in conjunction with FIGS. 4a, 4b and 5. The position signals generated via this kind of scanning beam path serve, for example, in a machine controller—not shown—to position certain machine components in a defined manner. The scanning beam path used for generating these position signals is essentially equivalent to the beam path that is known from the second exemplary embodiment of the aforementioned US Patent Application Publication No. 2012/105862 A1. FIGS. 4a, 4b of the present application show the scanning beam path between the light source 1 and the detector elements 3.1-3.3 of the detector arrangement in various views, while FIG. 5 shows a developed view of the scanning beam path.

As shown in FIGS. 4a-b, a collimated beam emitted by the light source 1 first, at point P1, strikes the substrate 24 of the second scale 20 at an angle or slant. The substrate 24 transmits the beam via the point P2, so that at point P3 it strikes the incident light grating of the first graduation 11, which splits it into two partial beams and deflects them in the y-direction. Next, at points P4a, P4b, the partial beams reach a first region of the transmitted light grating of the second graduation 21 on the substrate 24. There, the two partial beams undergo a diffraction and are once again aligned parallel to the z-direction and are focused in the x-direction, by the action of a superimposed cylindrical lens, at the points P5a, P5b on the reflector 21.3 on the underside of the substrate 24. After the reflection, the partial beams, at the points P6a, P6b, reach a second region of the transmitted light grating of the second graduation 21 on the substrate 24, wherein the partial beams undergo another diffraction so as to form second diffracted partial beams. In addition, by the action of a cylindrical lens of the second region, the second diffracted partial beams are recollimated in the x direction and, by a superimposed deflection (defined to be the combined/superimposed deflections caused separately by the second graduation 21 at points P6a, P6b and the cylindrical lens in the second region), they are deflected back in the opposite direction of the incident partial beams. As a result, both partial beams strike the incident light grating of the first graduation 11 at a common point P7, where they are superimposed, and they emerge as interfering partial beams in a resultant $0^{th}$ and $\pm 1^{st}$ order of diffraction via the points P8a, P8b, P8c and P9a, P9b, P9c of the substrate 24 of the second scale 20. The detection by optoelectronic detector elements 3.1, 3.2, 3.3 of the detector arrangement and the generation of phase-shifted position signals regarding the relative positions of the two scales 10, 20 is then effected as in the first exemplary embodiment, for example, of US Patent Application Publication No. 2012/105862 A1. Alternatively to this, it would also be possible to couple the partial beams into optical waveguides and transmit them to a downstream remotely located electronic evaluator.

Now, both the individual provisions of the invention and the concrete procedure for referencing the two scales 10, 20 of the optical position measuring instrument of the invention will be explained in detail.

Figure 2:
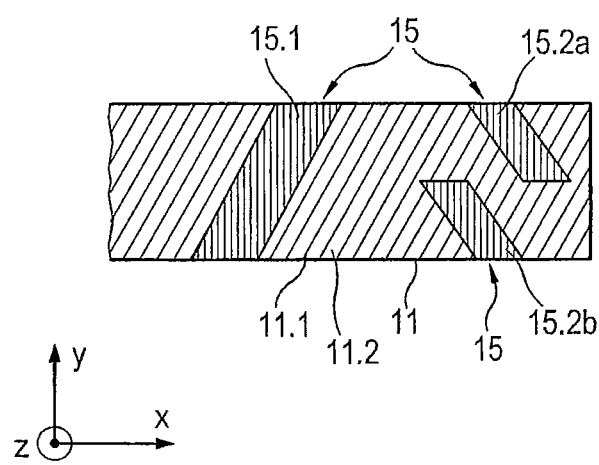
FIG. 2 is a fragmentary view of an embodiment of a first scale used with the optical position measuring instrument of FIG. 1 and an embodiment of a first graduation in the vicinity of an embodiment of a first reference marking in accordance with the present invention.

The first marking, in the form of a reference marking 15, used for referencing the first scale 10 is shown in the fragmentary view of the first graduation 11 in FIG. 2. The first graduation 11, as already mentioned above, is embodied as a linear grating, which has graduation regions 11.1, 11.2 with different phase depths that are disposed periodically in the first measuring direction x. In the present exemplary embodiment, the longitudinal axis of the rectangular graduation regions 11.1, 11.2 of the first graduation 11 is oriented obliquely to the first measuring direction x, or in other words at an angle other than 90°, but it is understood that still other angles may be provided here. As seen in FIG. 2, at the selected reference position of the first graduation 11, the first reference marking 15 in the exemplary embodiment shown includes a first partial marking 15.2a, 15.2b and a second partial marking 15.1. The two partial markings 15.1, 15.2a, 15.2b each includes linear structures, which are integrated into the first graduation 11 and as can be seen each include linear gratings, whose graduation regions are disposed in rotated fashion relative to the graduation regions 11.1, 11.2 of the first graduation 11. In other words, the longitudinal axes of the graduation regions 11.1, 11.2 are angled/rotated with respect to the longitudinal axes of the linear structures of the first and second partial markings 15.1, 15.2a and 15.2b.

It proves here to be fundamentally advantageous if—as shown in the example—the first marking or reference marking 15 is disposed in a region of the first graduation 11 that is not being used for the actual position determination, namely on a longitudinal end of the first graduation 11.

The second partial marking 15.1, in the present exemplary embodiment, extends obliquely over the full width of the first graduation 11 and, as can be seen, includes a linear grating whose graduation regions are disposed in rotated fashion relative to the graduation regions 11.1, 11.2 of the first graduation 11.

The first partial marking 15.2a, 15.2b, conversely, provides two identically embodied partial linear structures, which are likewise disposed obliquely relative to the first graduation 11 and each extend from the edge of the first graduation 11 to approximately the middle of the first graduation 11. The partial linear structures of the first and second partial markings 15.1, 15.2a, 15.2b are offset in the first measuring direction x and, as already mentioned, each includes linear gratings, whose graduation regions are disposed in rotated fashion relative to the graduation regions 11.1, 11.2 of the first graduation 11.

The graduation regions of the linear structures of the second and first partial markings 15.1 and 15.2a, 15.2b, respectively, are disposed in rotated fashion by the same angle in the plane of the graduation as, but in the opposite direction from, the graduation regions 11.1, 11.2 of the first graduation 11. Via the linear gratings of the linear structures 15.1, 15.2a, 15.2b, the result is certain optical effects on the partial beams striking them, as will be explained in further detail in the description that follows.

In such an embodiment of the first reference marking 15 for referencing the first scale 10, if the scanning beam sweeps over the second and first partial markings 15.1 and 15.2a, 15.2b, respectively, of the first reference marking 15 at the point P3, then the linear gratings of the two partial markings 15.1 and 15.2a, 15.2b, respectively, which linear gratings are disposed there at an angle different from the remainder of the graduation 11, have the effect that the partial beams reflected by them no longer strike the circular-annular reflector 21.3 of the second scale 20. In this manner, the scanning beam path described above is interfered with at a defined position in the first measuring direction x, for instance at a reference position, in a defined way as a result of the chosen embodiment of the first reference marking 15. This is due to the fact that the beams striking there and reflected are deflected, deviating from the desired scanning beam path, via the linear gratings of the second or first partial markings 15.1, 15.2a, 15.2b. The result is a pronounced signal breakdown of the detected signals, and this breakdown can then be used for identifying the defined position or reference position and thus for referencing the first scale 10. A first definitive functionality of the first reference marking 15 is, thus, that at the corresponding defined position in the first measuring direction, for instance at a predetermined reference position, a signal breakdown of the detected signals results, which in the present exemplary embodiment can be used for referencing the first scale 10. The concrete procedure in such a referencing process, which is based on this fundamental principle, will be described in further detail below.

In order to avoid a complete signal breakdown and, thus, a complete failure of the signals at the defined position or reference position during the referencing of the first scale 10, it proves to be advantageous if the length of the second and first partial markings 15.1, 15.2a, 15.2b, respectively, of the first reference marking 15 is selected to be less than the diameter of the partial beams scanning these regions of the graduation 11, as is indicated in FIG. 1. In that case, the result is merely signals of reduced signal amplitude.

The concrete embodiment of the second reference marking 25 used for referencing the second scale 20 will now be explained. For this, see FIG. 3b, which shows a top view on the reflector 21.3 of the second scale 20. As can be seen from this view, the second reference marking 25, on sides of the second scale 20 in the exemplary embodiment shown, includes a reflective subregion. Accordingly, at the selected reference position in the second measuring direction, the reflector 21.3 of the second graduation 21 on the underside of the substrate is widened perpendicular to the second measuring direction in a defined region.

Because of this embodiment of the second reference marking 25, this marking comes to rest in the scanning beam path only if the partial beams from the first graduation 11 are deflected into this region of the second graduation 21. This is the case only if in the present exemplary embodiment the reference position of the first scale 10 is approached and the first scale 10 remains in that position. As explained previously, the chosen embodiment of the first reference marking 15 and of the second and first partial markings 15.1, 15.2a, 15.2b has the effect that the partial beams reflected from them are then no longer deflected onto the circular-annular reflector 21.3 of the second scale 20, but rather are deflected into a region adjacent to the reflector 21.3 in the x-direction. The second reference marking 25, in the form of the reflective subregion, is again disposed there. Accordingly, if the first scale 10 is located in the intended reference position, then the second scale 20 can be referenced, in that by rotating the second scale 20 the partial beams sweep over the reflective subregion of the second reference marking 25 and generate an altered signal, with a pronounced signal rise, only at the reference position of the second scale 20. From this, a second reference signal for referencing the second scale 20 can be generated. In addition to the already mentioned definitive functionality and regarding the signal breakdown at the first reference position, the first marking or reference marking 15, thus, has as a further functionality, a switching function for selective activation of the second reference marking 25. Thus, in the present exemplary embodiment, only at the first reference position are the scanning beams deflected onto the second reference marking 25, which upon the passage over this second reference marking 25 leads to a detectable modulation in the signals detected. By comparison, if the first scale 10 is not located in the first reference position, then the second reference marking 25 is not illuminated by the scanning partial beams, and a passage over the second reference marking 25 fails to cause any change in the signals detected. Hence, the second reference marking 25 of the second scale 20 can be switched on and off in a defined way, specifically in that for referencing purposes, the first scale 10 is moved into the associated defined first position, such as the first reference position, and is moved away from that position in the regular measuring operation. An impairment of the signals by the reference marking 25 of the second scale 20 can thus be avoided in the measurement operation, and the entire scale region of the second scale 20, over the entire measurement length, can be used without limitation for the position determination in the measurement operation.

In conclusion, as an example, the incremental procedure for referencing the first and second scales 10, 20 will be explained in conjunction with FIGS. 6 and 7a-7f in an exemplary embodiment of the optical position measuring instrument of the present invention.

First, the referencing of the first scale 10 is done, which is described in conjunction with FIG. 6. For the referencing, the first scale 10 is driven or moved in the first measuring direction x, so that the scanning partial beams S1, S2 sweep over the region of the first reference marking 15 on the first graduation 11.

In FIG. 6, the partial beams 51, S2 that scan the graduation 11 in various positions during this drive motion of the first graduation 11 and the associated shape of the alternating component of the detected signals $I_{AC}$ are shown schematically. As explained above, at the positions x1 and x2 where the partial beams S1, S2 in the scanning beam path strike the second and first partial markings 15.1, 15.2a, 15.2b of the first reference marking 15, the result in each case is a pronounced signal breakdown, which can be used for referencing the first scale, since the position of the partial markings 15.1, 15.2a, 15.2b on the first graduation 11 is known. In the exemplary embodiment shown, in this way two first reference signals, which can be used for referencing the first scale, can accordingly be generated at the positions x1 and x2. Besides the referencing along the x-axis, referencing of the first scale can also be done along the y-axis perpendicular to the x-axis, since the y-axis positions of the partial markings 15.1, 15.2a, 15.2b on the graduation 11 are also known. The reason this is the case is that the partial markings 15.1, 15.2a, 15.2b are inclined relative to one another, and thus the spacing of the signal breakdown in the x-direction automatically defines the position of the partial beams in the y-direction on the first graduation 11.

After the referencing of the first scale, the referencing of the second scale then follows, which will be explained in conjunction with FIGS. 7a-7c, 8a-8c, and 9a-9c.

FIG. 7a again shows a top view on the first graduation 11 in the region of the reference marking 15. The two scanning partial beams S1, S2, in this position of the first graduation 11 in the first measuring direction x, are still located outside the region having the reference marking 15. In this phase, the signal generation therefore proceeds unimpeded. As can be seen from the developed view—which is simplified compared to FIG. 3—of the scanning beam path, in this position of the first graduation 11 the partial beams that are split at the point P3 of the first graduation 11 strike the reflector 21.3 of the second graduation precisely.

Figure 7C:
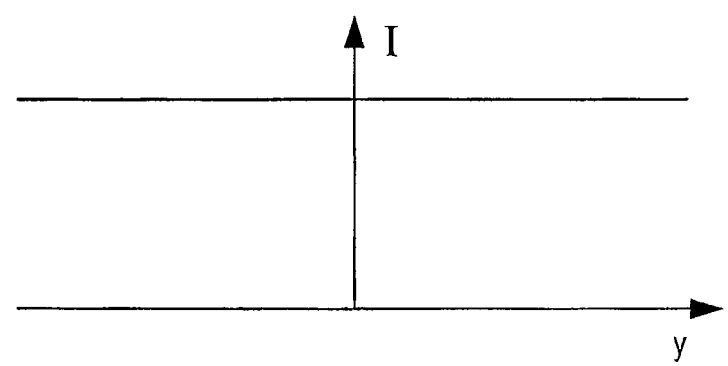

If in this position of the first scale 10 or graduation 11, the second scale is rotated about the axis of rotation, the result is the shape of the detected signals as shown in FIG. 7c. Both the direct-light component of the detected signals and the modulated component of the detected signals remain unchanged. Accordingly, there is no resultant change in the detected signals if the second scale 20 moves in the associated second measuring direction.

Figure 8A:
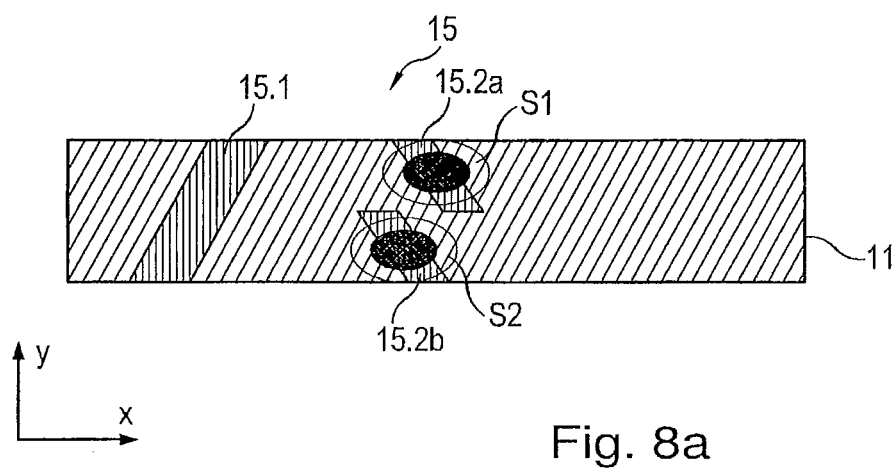
Figure 8B:
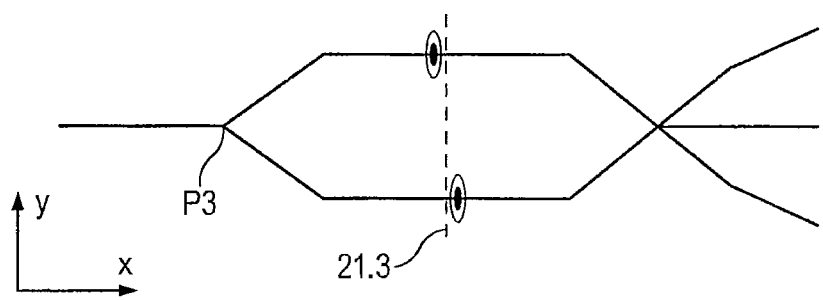

FIG. 8a now shows a situation in which the first graduation 11 has been displaced in the first measuring direction x far enough that the two scanning beams S1, S2 on the graduation 11 act upon the region of the first partial markings 15.2a, 15.2b, located toward the right, of the first reference marking 15. As can be seen from the developed view of the scanning beam path in FIG. 8b, in this position of the first graduation 11 the partial beams that have been split at the point P3 of the first graduation 11 now no longer strike the reflector 21.3 of the second graduation but instead are offset from it in the first measuring direction x.

Figure 8C:
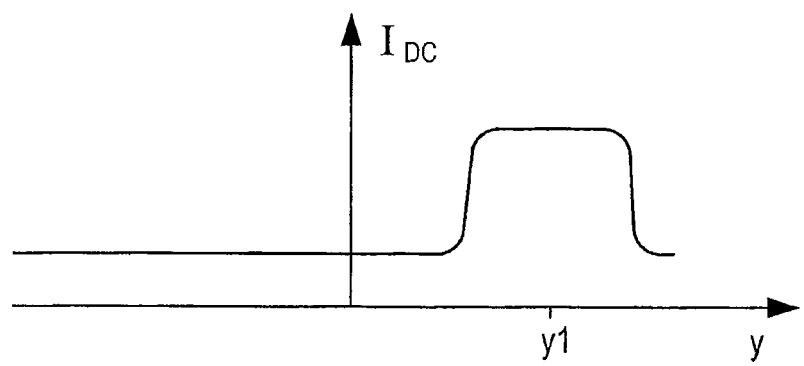

If in this position of the first scale 10 or graduation 11 the second scale is again rotated about the axis of rotation, the result is the shape of the direct-light component of the detected signals $I_{DC}$ shown in FIG. 8c. As shown, at that position y1 in the second measuring direction y, the result is a signal increase where the second reference marking or the corresponding reflective region is disposed.

Figure 9A:
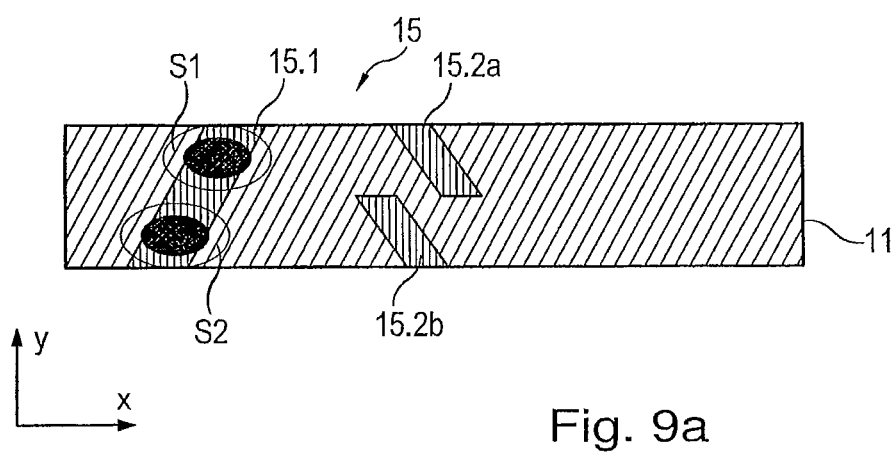
Figure 9B:
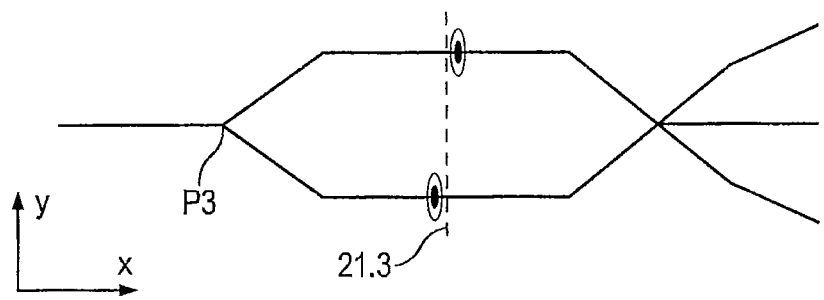

Analogously, the signal variation is also effected in the situation shown in FIG. 9a. Here, the first graduation has been displaced still farther in the first measuring direction x, so that the two scanning beams S1, S2 on the graduation 1 act upon the region of the second partial marking 15.1, on the left, of the first reference marking 15. Again, as seen from the developed view of the scanning beam path in FIG. 9b, in this position of the first graduation 11 the partial beams, split at the point P3 of the first graduation 11, no longer strike the reflector 21.3 of the second graduation but instead are offset somewhat in the first measuring direction x.

Figure 9C:
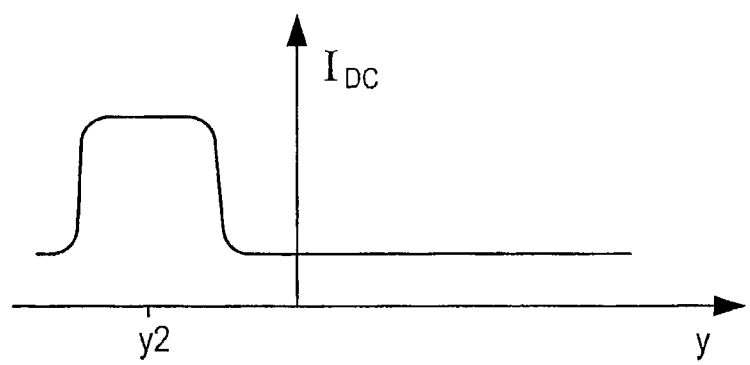

If in this position of the first scale 10 or graduation 11 the second scale is once again rotated about the axis of rotation, the result is the shape of the direct-light component of the detected signals $I_{DC}$ as shown in FIG. 9c. At the position y2 in the second measuring direction y, the result is a signal increase where the second reference marking or the corresponding reflective region is disposed.

From the known location of the second reference marking on the second scale and from the ascertained positions y1, y2 where in the procedure described a signal increase results, the desired referencing of the second scale as well can then be performed. In it, from the location of the first signal increase, an angle of rotation of the second scale can be determined;

from the spacing of the two signal increases, the position of the second scale in the z-direction can be determined.

Besides the exemplary embodiment described, it is understood that still other possible embodiments can be implemented within the scope of the present invention.

For instance, in a further embodiment of the optical position measuring instrument of the present invention, it may be provided that the first marking on the first scale does not function as a reference marking for this scale, or, in other words, for referencing the first scale, but essentially has only the switching function for the selective activation of the second reference marking. To that end, a three-dimensionally bounded first marking would have to be disposed at least one defined position in the first measuring direction. For that purpose, as an example, once again a position on a longitudinal end of the first graduation would be especially suitable.

Figure 10:
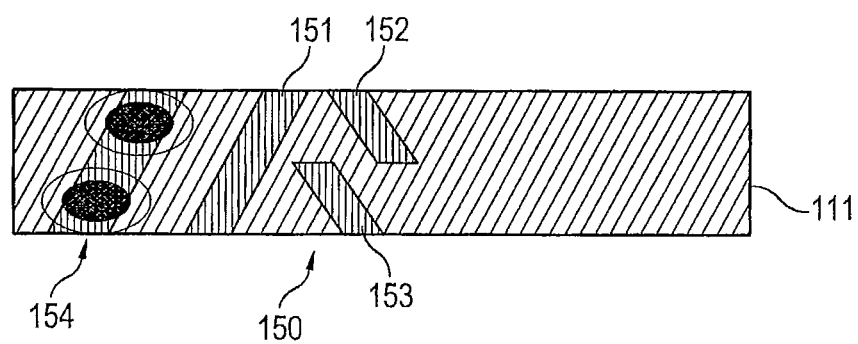
FIG. 10 is a fragmentary view of a second embodiment of a first scale with the first graduation of FIG. 2 in the vicinity of the first marking of FIG. 2.

A further possible embodiment of a suitable first marking 150 is shown in FIG. 10, which analogously to FIG. 2 shows a part of the first graduation 111. The first marking 150 employed here again includes two partial markings 154 and 151-153. In the exemplary embodiment shown, the first partial marking 151-153 includes a plurality of absorber regions, which are integrated into the first graduation 111. The partial beams striking these absorber regions of the first partial marking 151-153 are not reflected, or are reflected only slightly, by these absorber regions. The second partial marking 154 is embodied analogously to the second partial marking 15.1 of FIG. 2 and includes a linear grating disposed in rotated fashion in this region relative to the first graduation 111. The absorber regions of the first partial marking 151-153 have no such substructure.

In this embodiment, only the absorber regions of the first partial marking 151-153 now serve the purpose of referencing the first graduation 111 or for generating a signal breakdown of the detected signals at a defined position in the first measuring direction.

In the region of the second partial marking 154, the partial beams striking it are again deflected in a defined manner by the linear grating provided there. That is, the second partial marking 154 has a switching function for selectively activating the second reference marking on the second scale. Accordingly in this variant, in contrast to the embodiment described above, for the two definitive functions of the first reference marking 150, separate elements are provided, namely the second partial marking 154, on the one hand, and the first partial marking 151-153, on the other. The various partial markings or structures on the first scale thus serve both to switch or activate the second reference marking on the second scale and to reference the first scale.

Instead of the absorber regions provided in this variant for the first partial marking, it is understood that further alternatively embodied structures can be employed, which alter the detected signals with regard to their phase relationship or in their amplitude.

With regard to the second reference marking on the second scale as well, further possible embodiments are within the scope of the present invention. For instance, it can be provided that in addition to the reference marking 25 provided in FIG. 3b only on one side of the reflector 21.3, a second such reflective subregion can be disposed on the opposite side of the reflector 21.3. In that case the second reference marking includes two reflective subregions disposed in mirror symmetry with the reflector 21.3.

Furthermore, it is possible for a plurality of second reference markings to be disposed in the measuring direction of the second scale in spacing-coded fashion, or, in other words, with noticeably different spacings in the measuring direction.

It is moreover possible to establish an absolute position relationship in the incremental measurement in the second measuring direction, without requiring the scale, in the least favorable case, to be rotated by a full revolution.

In addition, the present invention can be employed not only in conjunction with a linear first scale and a circular-annular second scale. Instead, it is also possible in an alternative embodiment for the first and second scales each to include a linear grating as an graduation, the linear gratings being oriented perpendicularly to one another and being movable independently of one another.

Moreover, the described embodiment of the first graduation as a linear incident light grating is not compulsory. For instance, alternatively to the exemplary embodiments described above, it would also be possible that the first graduation is embodied as a transmitted light grating, and so forth.

The foregoing description is provided to illustrate the present invention, and is not to be construed as a limitation. Numerous additions, substitutions and other changes can be made to the invention without departing from its scope as set forth in the appended claims.

We claim:

1. An optical position measuring instrument, comprising:
 a first scale comprising a first graduation, wherein said first scale is disposed movable in a first measuring direction, and, at a certain position, said first scale comprises a first marking that is finite in size, differs from said first graduation, and indicates a first defined position of said scale in space and along said first measuring direction; and
 a second scale comprising a second graduation, wherein said second scale is disposed movable in a second measuring direction, and, at a second defined position of a portion of said second scale, said second scale comprises a reference marking that has a structure that generates at least one reference signal at a reference position of said second scale only if said first scale is located in said first defined position.

2. The optical position measuring instrument as defined by claim 1, wherein said first graduation is a linear grating comprising first graduation regions disposed periodically in said first measuring direction, which is linear; and
 wherein said second graduation comprises a circular-annular grating comprising second graduation regions disposed periodically in said second measuring direction, which is in a circular circumferential direction that is disposed concentrically about an axis of rotation of said second scale.

3. The optical position measuring instrument as defined by claim 1, wherein said first graduation is a linear grating comprising first graduation regions disposed periodically in a first linear measuring direction; and
 wherein said second graduation is a linear grating comprising second graduation regions disposed periodically in a second linear measuring direction, and said second linear measuring direction is oriented perpendicular to said first linear measuring direction.

4. The optical position measuring instrument as defined by claim 1, wherein said first graduation is embodied as an incident light grating comprising periodically disposed graduation regions having different phase depths; and
 wherein said second scale further comprises a transmitted light grating and a reflector, wherein said transmitted light grating and said reflector extend in said second measuring direction.

5. The optical position measuring instrument as defined by claim 4, wherein said transmitted light grating is embodied as a combined radial/circular grating, which has periodically disposed graduation regions having different diffraction properties.

6. The optical position measuring instrument as defined by claim 1, wherein said first marking is embodied to cause a signal breakdown of detected signals at said first defined position and a switching function for selective activation of said second reference marking.

7. The optical position measuring instrument as defined by claim 6, wherein said first marking comprises a first partial marking and a second partial marking.

8. The optical position measuring instrument as defined by claim 7, wherein said first marking comprises an absorber region, which is integrated into said first graduation and only slightly reflects or does not reflect partial beams striking it.

9. The optical position measuring instrument as defined by claim 7, wherein said first marking comprises a linear structure, which is integrated into said first marking, wherein said linear structure comprises a linear grating comprising first graduation regions disposed in rotated fashion relative to second graduation regions of said first graduation.

10. The optical position measuring instrument as defined by claim 7, wherein said second partial marking comprises a linear structure, which is integrated into said first graduation, wherein said linear structure comprises a linear grating comprising first graduation regions of which are disposed in rotated fashion relative to second graduation regions of said first graduation.

11. The optical position measuring instrument as defined by claim 6, wherein said first marking is disposed on a longitudinal end of said first graduation.

12. The optical position measuring instrument as defined by claim 7, wherein said first partial marking has a length that is less than a first partial beam that scans said first partial marking, and said second partial marking has a length which is less than a diameter of a second partial beam that scans said second partial marking.

13. The optical position measuring instrument as defined by claim 6, wherein said first marking is embodied as a second reference marking and serves to generate a second reference signal at a second reference position of said first scale, and said reference signal is generated at said reference position of said second scale only if said first scale is located at said second reference position.

14. The optical position measuring instrument as defined by claim 13, wherein said reference marking is embodied such that said reference marking is acted upon by a scanning partial beam only if said first scale is located in said first defined position.

15. The optical position measuring instrument as defined by claim 14, wherein said reference marking is embodied as at least one reflective reference region, which is disposed at said reference position of said second scale perpendicular to said second measuring direction, adjacent to a reflector of said second graduation.

16. The optical position measuring instrument as defined by claim 1, wherein said reference marking is embodied such that said reference marking is acted upon by a scanning partial beam only if said first scale is located in said first defined position.

17. The optical position measuring instrument as defined by claim 1, comprising:
a light source; and
a detector arrangement comprising a plurality of detector elements, wherein
an incident beam from said light source is split at said first graduation into two partial beams;
said two partial beams are propagated in a first direction toward a transmitted light grating of said second graduation at which diffracted partial beams are formed;
said diffracted partial beams are propagated in a direction toward a reflector of said second graduation at which said diffracted partial beams undergo a back-reflection and are propagated in a second direction toward said transmitted light grating of said second graduation at which said diffracted partial beams undergo another diffraction so as to form second diffracted partial beams;
said second diffracted partial beams are propagated in a direction toward said first graduation at which a superposition of said partial beams results so that interfering partial beams are formed; and
said interfering partial beams are propagated in a direction toward said plurality of detector elements, wherein said plurality of detector elements generate from said interfering partial beams position signals regarding a relative position of said first scale and said scale.

* * * * *